United States Patent
Kwa et al.

(10) Patent No.: US 9,251,552 B2
(45) Date of Patent: Feb. 2, 2016

(54) METHOD AND APPARATUS FOR MANAGING IMAGE DATA FOR PRESENTATION ON A DISPLAY

(75) Inventors: Seh Kwa, Saratoga, CA (US); Nir Sucher, Ramat Hashofet (IL); Vijay Sai Reddy Degalahal, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 466 days.

(21) Appl. No.: 13/536,221

(22) Filed: Jun. 28, 2012

(65) Prior Publication Data
US 2014/0002465 A1 Jan. 2, 2014

(51) Int. Cl.
  G06F 13/14 (2006.01)
  G06F 15/00 (2006.01)
  G06T 1/00 (2006.01)
  G06T 1/20 (2006.01)
  G09G 5/36 (2006.01)

(52) U.S. Cl.
  CPC ...... *G06T 1/20* (2013.01); *G09G 5/363* (2013.01); *G09G 2330/021* (2013.01); *G09G 2340/0435* (2013.01); *G09G 2360/18* (2013.01)

(58) Field of Classification Search
  CPC ............ G06F 15/00; G06T 1/00–1/0092; G06T 1/60; G09G 5/36–5/366
  USPC .................................. 345/501, 530, 545
  See application file for complete search history.

(56) References Cited

U.S. PATENT DOCUMENTS

| 2008/0143731 | A1* | 6/2008 | Cheng et al. ............. 345/502 |
| 2012/0242671 | A1* | 9/2012 | Wyatt ....................... 345/520 |
| 2013/0021352 | A1* | 1/2013 | Wyatt et al. .............. 345/520 |

* cited by examiner

Primary Examiner — Jacinta M Crawford
(74) Attorney, Agent, or Firm — Kacvinsky Daisak Bluni PLLC

(57) ABSTRACT

An apparatus may include a memory and graphics logic operative to render a set of one or more data frames for storage in the memory using a received set of data of a digital medium, and output one or more control signals at a first interval. The apparatus may also include a display engine operative to receive the one or more control signals from the graphics logic, retrieve the set of one or more data frames from the memory, and send the one or more data frames to a display device for visual presentation. The one or more data frames may be sent periodically in succession at a second interval corresponding to a native frame rate of the digital medium.

14 Claims, 14 Drawing Sheets

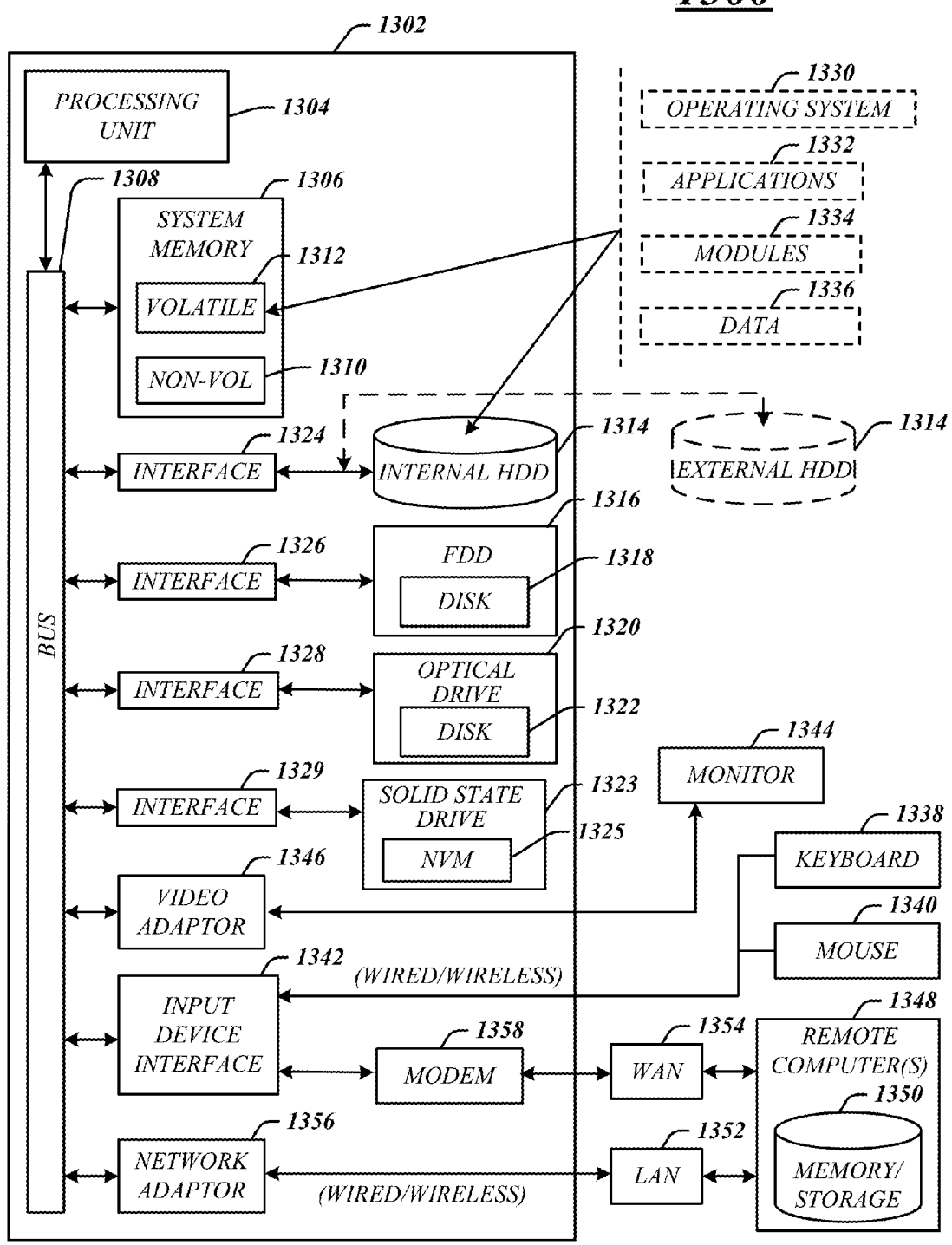

METHOD AND APPARATUS FOR MANAGING IMAGE DATA FOR PRESENTATION ON A DISPLAY

BACKGROUND

When video images are presented on an electronic display, just as in film, images are displayed as frames. The refresh rate of a display, that is, the number of times the actual screen image is completely reconstructed every second, tends to be relatively high because more frequently refreshing the screen (display) creates a smoother perceived video image in terms of motion rendering and flicker reduction.

Refresh rates of televisions and other types of video displays are measured in "Hz" (Hertz). For example, a display that has a typical 60 hz refresh rate represents complete reconstruction of the screen image 60 times every second. However, in the present day, it is typical for digital media such as digital video to be recorded at a native frame rate for that digital medium that is different than a refresh rate for a display device that presents the content of the digital medium during playback. As a result, this means that each video frame for a digital medium that has a native frame rate of 24 frames/sec, for example, is repeated more than once on a display that employs a typical refresh rate. This is evident from the fact that the screen image on the display is updated every 16.6 msec (=1/(60 refresh/sec)) for a 60 Hz refresh rate, while a new image of the digital medium is only uploaded to the display once every 41.6 msec (=1/(24 frames/second)).

In other words, although displays may employ refresh rates that are 60 Hz or higher, there are still only 24 separate frames of the digital medium that are displayed every second, which may need to be displayed multiple times, depending on the refresh rate of the display.

Typically, present day displays such as a liquid crystal display (LCD), plasma display, cathode ray tube, light emitting diode display or other display may have a refresh rate of 60 Hz, 72 Hz, 120 Hz, or other refresh rate that is greater than the native frame rate as in the above-illustrated example. In order to accommodate the difference between the native frame rate of the medium whose visual content is to be viewed and the frame refresh rate of the display to present the visual content, present day techniques employ a complex set of operations. In typical implementations multiple redundant memory reads and writes are performed as frame data is moved from a graphics processor to display electronics, which may require translator functionality from display engine to the memory and from display engine to the display panel. A timing controller (TCON) may be located on the display panel, which additionally performs another translator function to reformat pixel information to drive the display panel's row/column drivers.

In one example, during streaming of content, such as DVD content, graphics logic in a graphics processor or part of a central processing unit may render a new image and write it into the system memory. Subsequently, a translation function may be performed when a display engine reads the content from memory and prepares pixel packets to be ready for transmission to an LCD panel for display of the DVD video content. Upon reception of the pixel packets by the timing controller (TCON) on the LCD panel, another translation function is performed to readjust the pixel values to meet the LCD panel requirements and reform for transmission on an internal bus (typically mini LVDS) to the row/column drivers. This partition between graphics and display may serve some systems adequately, for example, a system that includes a desktop computing device motherboard and an external monitor, but may incur undesirable redundancy and inefficiency for display of video content on other devices such as mobile computing devices. This redundancy and inefficiency may especially be evident from a power consumption perspective, because devices including central processing units (CPU), graphics processing units (GPU) and display interface devices consume an undesirable amount of power to perform the above operations.

Accordingly, there may be a need for improved techniques and apparatus to solve these and other problems.

BRIEF DESCRIPTION OF THE DRAWINGS

FIG. 2 depicts exemplary operation of the system of FIG. 1a.

FIG. 3 depicts further operation of the system of FIG. 1a.

FIG. 13 is a diagram of an exemplary system embodiment.

DETAILED DESCRIPTION

Various embodiments involve novel systems, apparatus, and methods to present streaming images on a digital display. Various embodiments are directed to power optimization for the end-to-end data path between system memory and display panel when the native frame rate of a digital medium does not match the refresh rate of the display panel to present a visual representation of the digital medium.

Some embodiments employ modified operation of a graphics logic component in conjunction with a buffer integrated onto a digital display panel to optimize platform power consumption, such that platform components including central processing unit (CPU), graphics processing unit (GPU), voltage regulators, and/or other components may be placed in a reduced, or low, power mode at least intermittently during operations such as video streaming. In particular embodiments, the duration of low power mode may extend beyond that afforded by conventional architectures by modifying the manner in which data frames are scheduled to be fetched and transmitted from system memory to the display panel.

In some embodiments, the design and operation of components such as a graphics logic component and display engine, and/or components of a central processing unit, may be altered to modify data frame rendering and transmission of data frames to a display panel. These changes may entail changes in power management hooks that achieve power saving such as power managing of a display interface when no update is required.

Figure 1A:
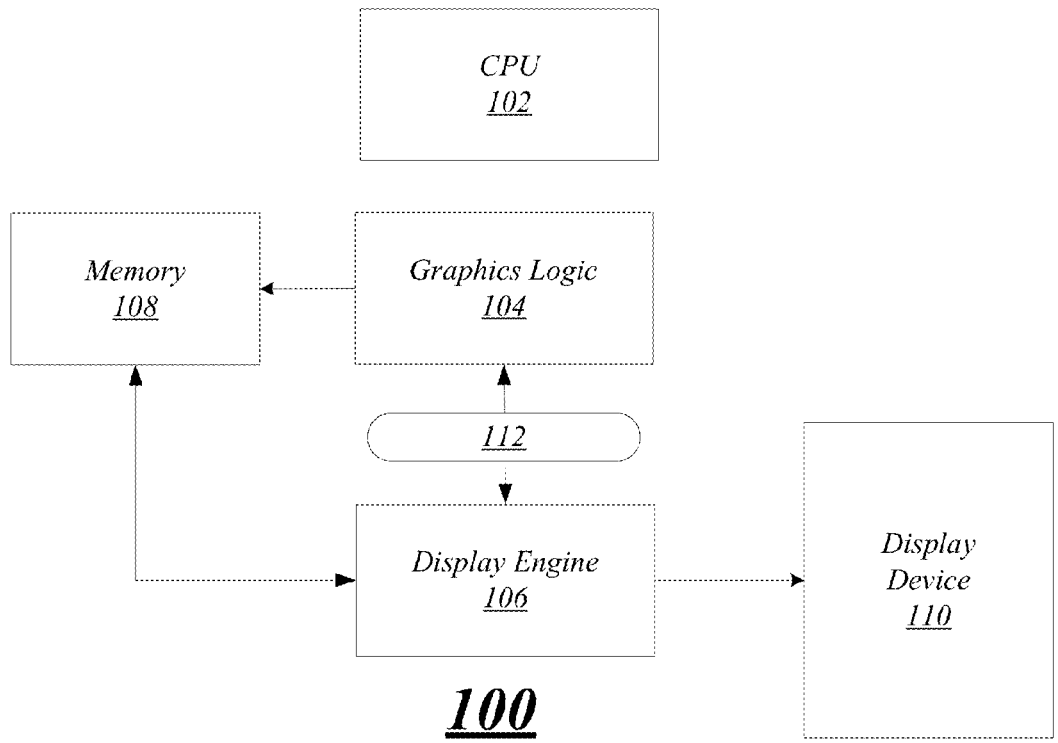
FIG. 1a depicts a block diagram of one system consistent with the present embodiments.

FIG. 1a depicts one system 100 consistent with the present embodiments. The system 100 includes a central processing unit (CPU) 102, graphics logic 104, display engine 106, memory 108, and display device 110. An interface 112 may couple the graphics logic 104 and display engine 106. In some embodiments, the system 100 may be embodied in a mobile device such as a laptop computer, tablet computing device, desktop computer, smartphone, or other electronic computing device or communications device. The embodiments are not limited in this context.

In particular, in various embodiments the CPU 102, graphics logic 104, and/or display engine 106 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The system 100 may execute communications operations or logic to process data received from various sources for presentation on a display, such as display device 110. The data may comprise media content such as video content or other images to be presented in succession on display device 110. Examples of a display device 110 include a liquid crystal display (LCD), light emitting diode display (LED), touch sensitive display, plasma display, cathode ray tube, and other display types.

In various embodiments, the system 110 may include various input devices (not shown) including, but not limited to, keyboards, microphones, mouse, joystick or other navigation devices, and so forth. The user may use such input devices to select media files from one or more media sources (not shown) for viewing on display device 110.

In various embodiments, the data for processing may be received from a digital medium or digital media. A source for digital media may be a digital camera, digital video device, smartphone, tablet computing device, computer, or other device that contains one or more media files that a user or users may wish to view on the display device 110. Other examples of media sources include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, video surveillance system, teleconferencing system, telephone system, wearable computers, portable media players (PMP), portable media recorders (PMR), digital media servers and so forth. The embodiments are not limited in this context. In further embodiments, a digital medium may be a data source that constitutes a combination of hardware elements such as a processor and memory that generates image data periodically, such as machine-generated animation.

It is to be noted that a media source may include data to be presented in audio format as well as visual format. Consistent with the present embodiments, the display device 110 or other devices (not shown) linked to display device 110 may be operative to output audio signals based on digital media content whose images are presented on display device 110.

In various embodiments, the digital media whose content is to be presented on the display device 110 may be a DVD or other medium in which the native frame rate differs from the refresh rate employed by the display device 110. As detailed in the FIGs. to follow, components of system 100 including, among others, graphics logic 104, display engine 106, interface 112, and memory 108, may be interoperable to adjust the processing of media content for presentation on display 110. The media content may be received as streaming data such as video data that is temporarily stored in system 100 while being processed to be shown on display 110. The adjustments in processing of data may include adjusting the timing for storing data in memory 108, for fetching data from memory 108, and transmitting the data to display device 110. As an example, an interface 112, which may be distributed as software, hardware, or a combination of hardware and software between graphics logic 104 and display engine 106, may facilitate handshaking between the graphics logic 104 and display engine 106 to steer new data for streaming to the display device 110.

Figure 1B:
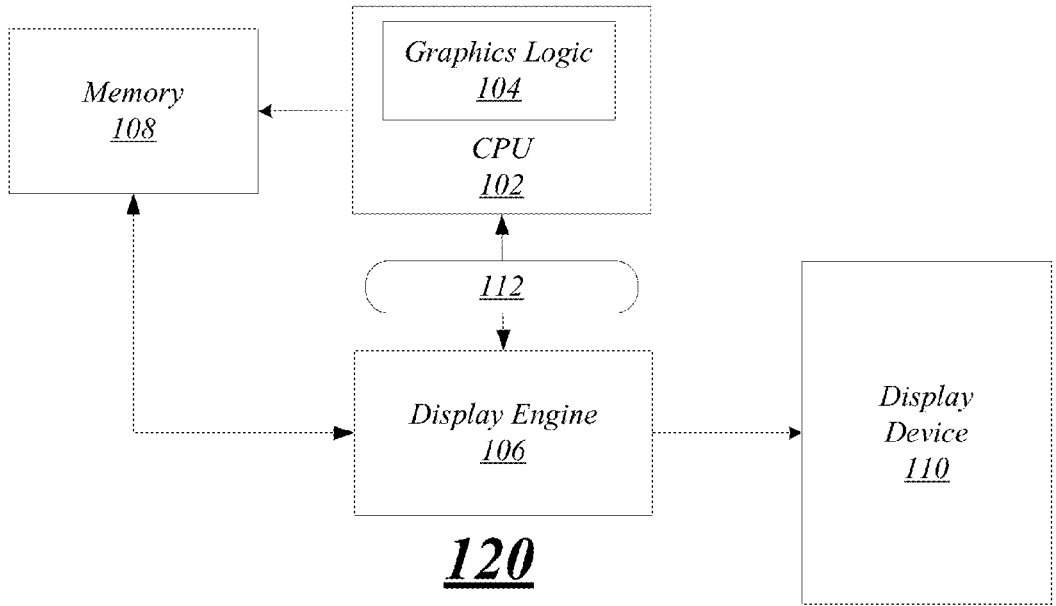
FIG. 1b depicts another block diagram of a system consistent with the present embodiments.

FIG. 1b depicts another block diagram of a system 120 consistent with the present embodiments. The system 120 may include generally similar components as system 100. As illustrated, in the system 120, the graphics logic 104 may be included in the CPU 102. In one particular variant, the CPU 102 may be a "system on a chip" (SOC) component that includes one or more general processors and the graphics logic 104 on a single silicon chip.

Figure 2:
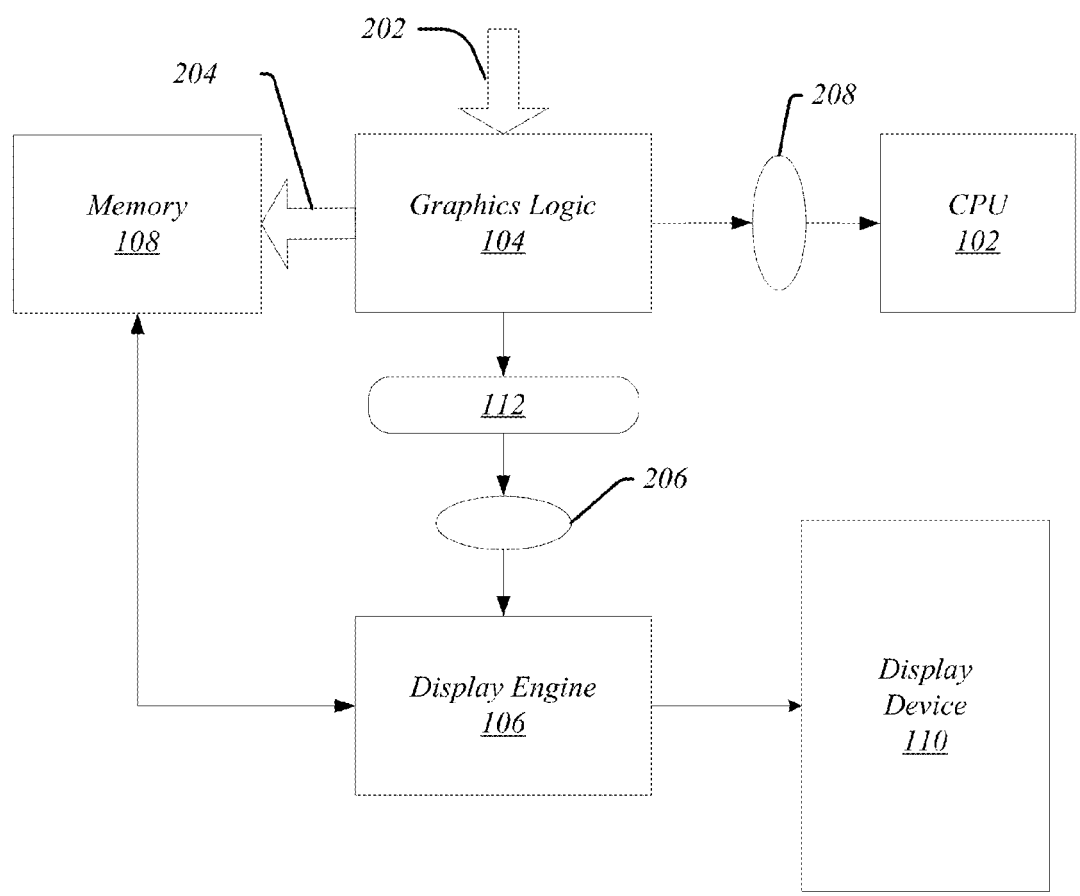

FIG. 2 depicts one example of operation of the graphics logic 104. In the scenario illustrated, the graphics logic 104 receives media content, or data 202, which may be rendered into a set of data frames that can be transmitted to the display 110 for presentation. In various embodiments, the data frames may be video or animation content generated from an external media source or may be machine generated data, such as machine generated animation that is generated in a computer or other device that houses the components 102, 104, 106, 108. In some embodiments, a data frame rate at which the graphics logic 104 receives the data 202 may be several frames per second up to 60 frames per second or higher. In some embodiments, the data frames may be generated from raw data while in other embodiments the data frames may be generated from compressed data.

In one example, video content that is encoded at 24 frames per second is received by graphics logic 104, which renders a set of one or more data frames 204 and transmits the set of data frames 204 for storage in memory 108. Having rendered the set of data frames 204, the graphics logic 104 may thereafter send a signal or message 206 that alerts the display engine 106 that there is new data frame(s) to be updated. The display engine 106 may transmit each new frame of the set of data frames 204 at the native frame rate of the medium of the data 202, or may send the new data frame within a time period corresponding to the refresh rate of display device 110, such as 16.6 msec, with panel horizontal synchronization/vertical synchronization (Hsync/Vsync) timing.

After data frames 204 are rendered, a signal 208 may also be sent to various components of system 100 to direct the components to enter a low power mode. For example, the signal 208 may be sent to the CPU 102 to enter a lower power mode. The term "low power mode" as used herein refers to an operating mode for running an electronic component that consumes less power than an active mode in which circuitry is operating at full voltage and clock frequency. In the case of microprocessor components, the term "lower power mode" may thereby include what are generally referred to as higher C-states or C-modes for operation of a CPU. As is known, in order to save energy when the CPU is or is expected to be idle, the CPU can be commanded to enter a low-power mode. Each CPU may be configured to operate in several power modes and they are collectively called "C-states" or "C-modes."

When a processor, such as a CPU is in active operation, the C-state is generally referred to as C-0, while other, lower power states (modes) are referred to as C-1, C-2, C-3, C-4, C-5, C-6, and so forth. Except for C-0, all other C-states represent what may be considered a state of idleness for the processor, where the higher the C-state, the less power is consumed. The basic purpose of these modes is to cut the clock signal and power from idle units inside the CPU to conserve power. The more units to be halted (by cutting the clock), by reducing the voltage, or even completely shutting down, the more energy is saved.

Consistent with the present embodiments, a signal, such as signal 208, may place other components such as voltage regulators (not shown) and/or a graphics processor (GPU) into a low power mode. The graphics processor may be embodied in the graphics logic 104 in some embodiments. For example, a GPU may in general operate in different power states (RC states), which may differ from the C-states of a CPU. In the present embodiments, the signal 208 may place the GPU into an RC-state that represents a lower power state than before the signal 208 is generated.

In additional embodiments, the signal 208 may generate a low power mode in which the CPU 102 is rendered inactive while the graphics logic 104 remains active or the low power mode may entail an inactive graphics logic 104 and active CPU 102. As discussed in more detail below, the duration of the low power mode may be determined according to the timing for sending additional messages 206 to the display engine 106.

Figure 3:
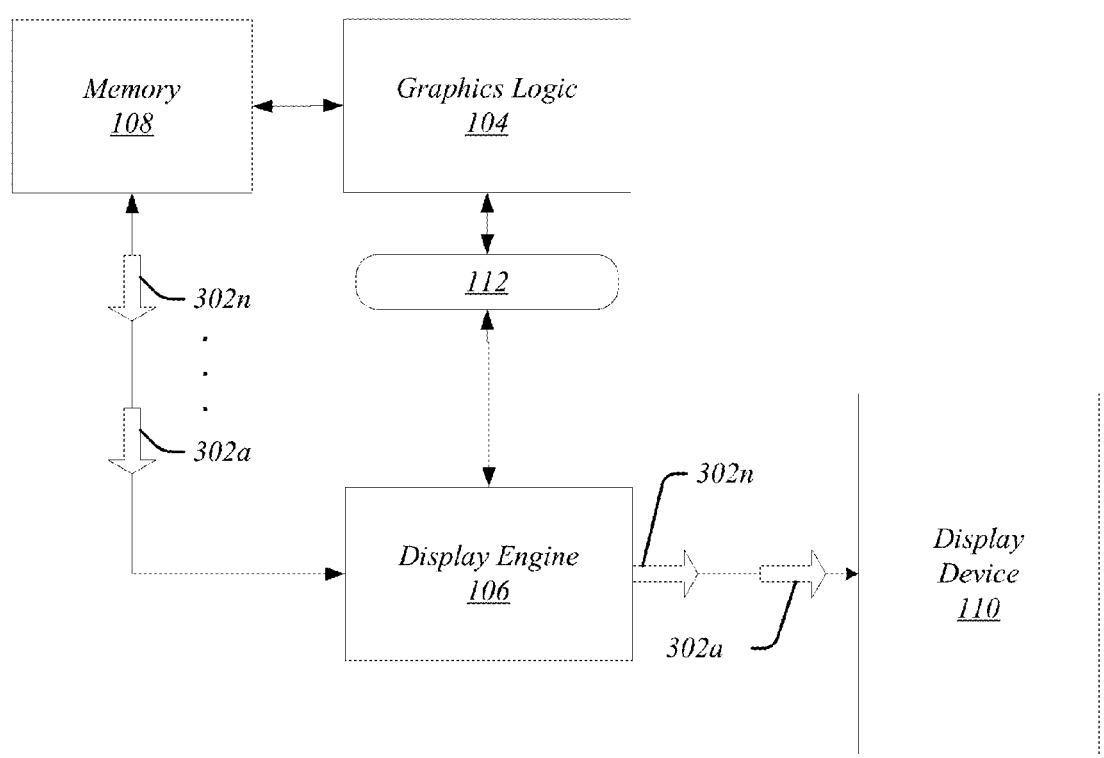

FIG. 3 depicts operation of the display engine 106 consistent with various embodiments. Following the example of FIG. 2, after receipt of a message 206 from the graphics logic 104, the display engine 106 may perform a series of operations to retrieve and transmit data to the display device 110. For example, the message 206 may trigger the display engine 106 to retrieve a series of data frames stored in system memory by graphics logic 104.

In the example depicted in FIG. 3, the display engine 106 retrieves at different instances a series of data frames 302a to 302n, where "a" to "n" may represent any positive integer. Consistent with the present embodiments, the data frames 302a to 302n may be transmitted to the display device 110 in a manner such that the interval (period) between sending of successive data frames corresponds to the period defined by the native frame rate of the medium from which data frames 302a to 302n are created. As discussed below, this may reduce the number of times data is transmitted between memory 108 and display device 110, as well as the number of times data is stored at display device 110 in order to present a given set of data frames, such as a movie, video, or other set of images.

Figure 4:
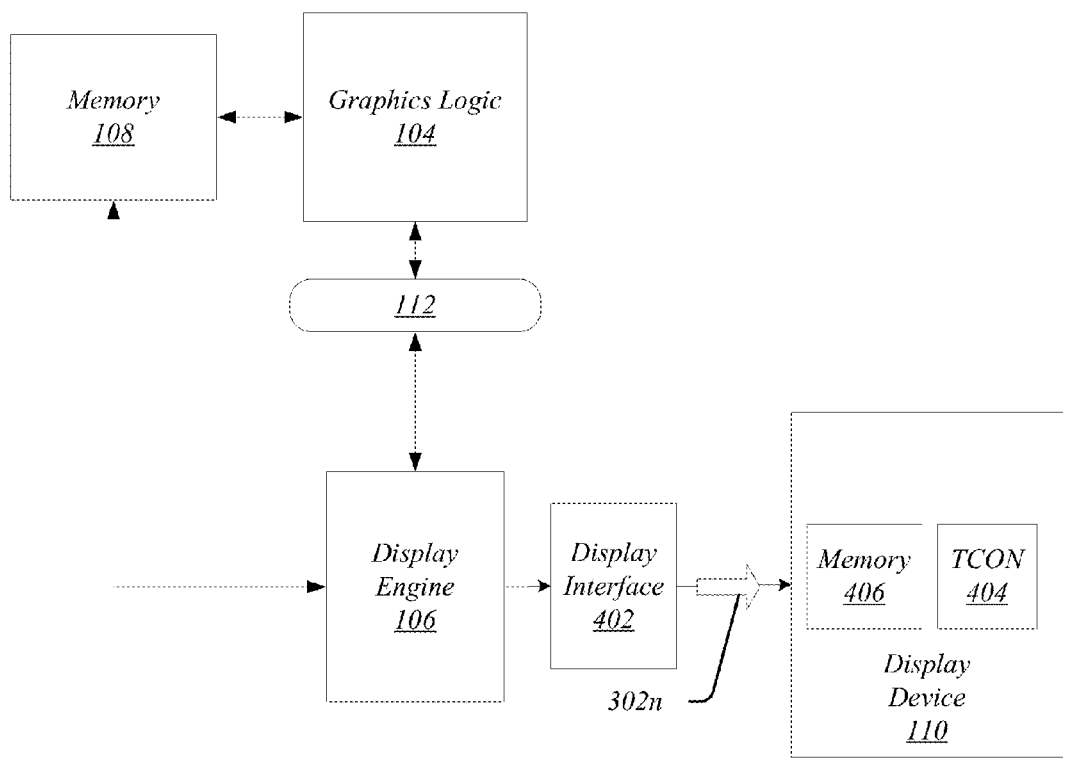
FIG. 4 depicts a block diagram and operation of another system embodiment.

FIG. 4 depicts operation of the display device 110 consistent with the present embodiments. As shown in FIG. 4, a display interface 402 may be provided to facilitate communication between the display engine 106 and display device 110. In some embodiments, the components of the display interface 402 may be distributed between the display engine 106 and display device 110, and may be embodied as software, hardware, or a combination of hardware and software. In the embodiment illustrated in FIG. 4, the display device 110 includes a timing controller (TCON) 404 and memory 406. Consistent with some embodiments, the display interface 402 may support a protocol such as single-frame update protocol. The single-frame update protocol may entail a single-update of video frame content such as a single pulse with a return to idle upon completion of the update.

Following the example of FIGS. 2 and 3, the data frames 302a to 302n may be individually transmitted in succession to the display device 110 at a frequency corresponding to the native frame rate of the medium from which data frames 302a to 302n are created. The timing controller 404 may be operable to store, for example, one frame at a time of data frames 302a to 302n in memory 406. The succession of data frames 302a to 302n may then be stored for an interval required for refreshing the display of display device 110 at its operating (required) refresh rate, which may be a higher rate than the native frame rate of data frames 302a to 302n. Because the display device 110 may store a currently displayed frame to the memory 406, the display device 110 may retrieve the data frame multiple times from memory 406 for presentation on a display screen, depending on the refresh rate of the display (screen). However, the retrieving of a data frame from memory 406 may be performed without requiring a data frame 302a to 302n to be redundantly retrieved and/or sent from memory 108 to the display device 110, as may be the case in conventional streaming of media to a display device. This feature of the present embodiments is detailed in the FIGS. to follow.

Figure 5A:
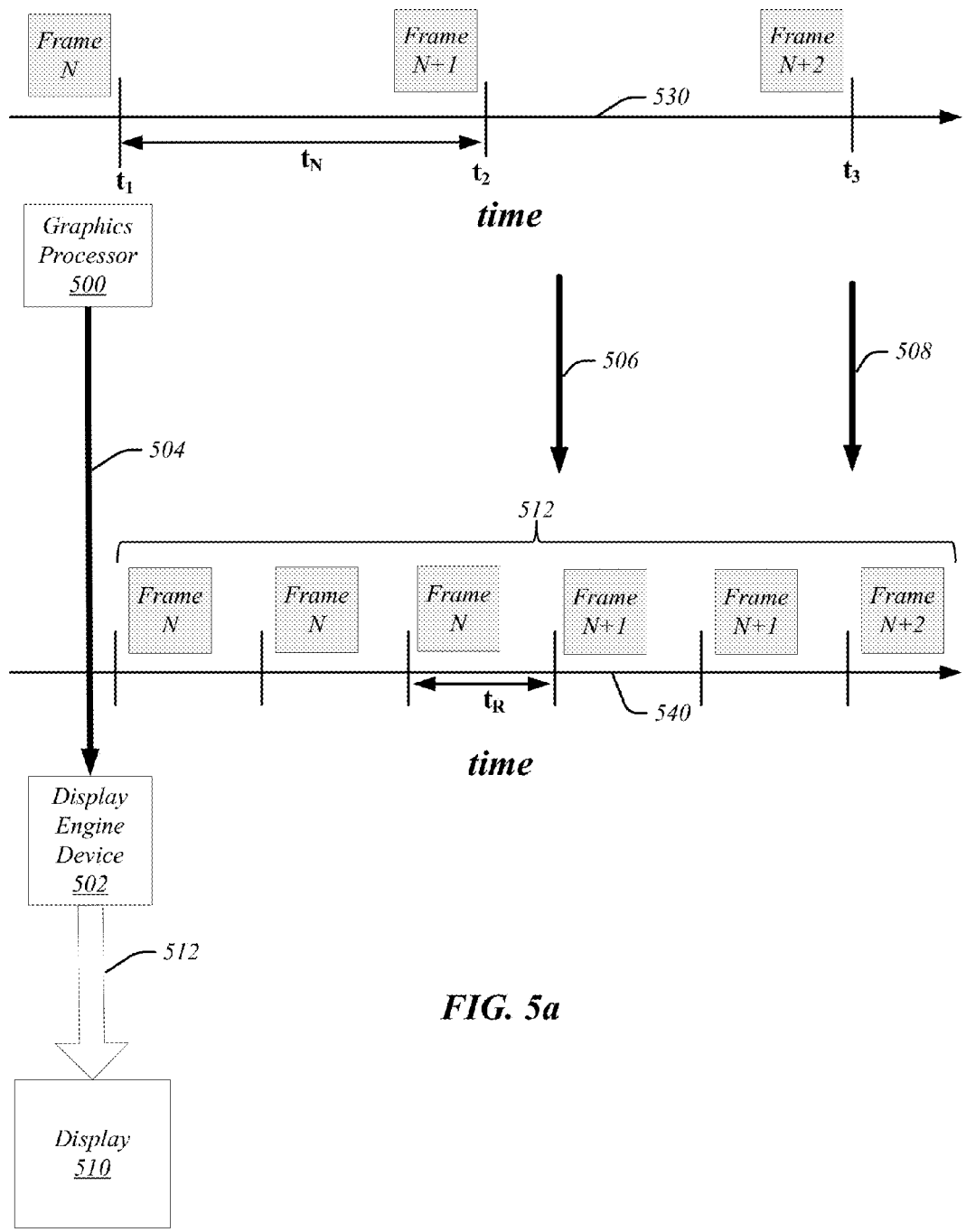
FIGS. 5a and 5b compare operation according to a conventional scheme and an embodiment, respectively.
Figure 5B:
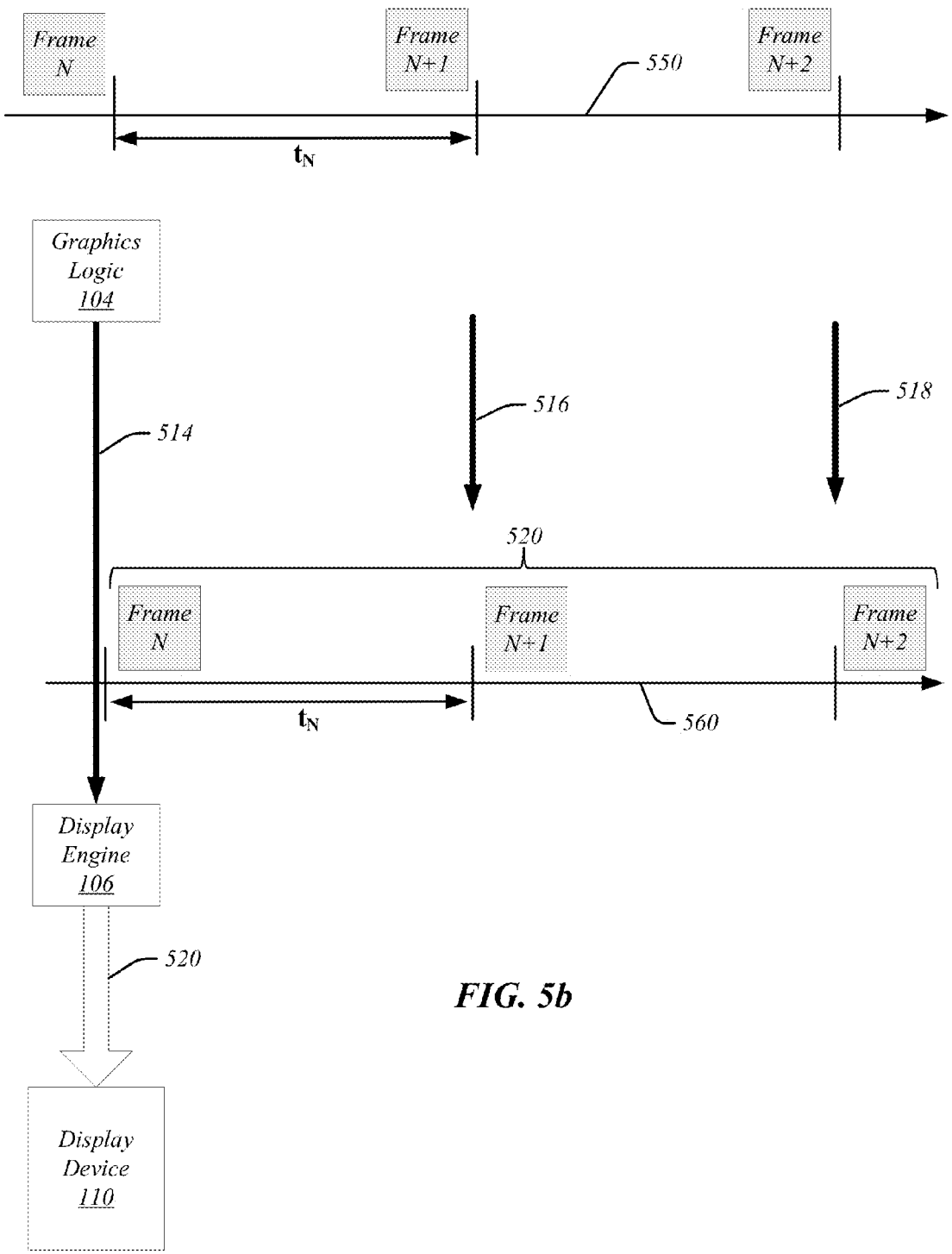

FIGS. 5a and 5b compare the playback of a digital medium according to a conventional scheme and that consistent with the present embodiments. In FIG. 5a, a conventional playback scheme is illustrated in which a graphics processor renders a series of data frames that are transmitted by a display engine device for presentation on a display. In FIG. 5a, the data frame rendering timeline 530 illustrates that a graphics processor 500 renders a series of data frames N, N+1, N+2 at an interval $t_N$ that corresponds to a native frame rate, which may be 24 frames per second in the case of a DVD media source. Thus, the value of $t_N$ may be ¹⁄₂₄ seconds, or about 41.6 msec for a DVD playback example.

Upon rendering of the frame N the graphics processor 500 sends a signal 504 which may trigger the display engine device 502 to retrieve the frame N for sending to the display 510. In accordance with known schemes, the signal 504 may constitute a control signal such as what a frame buffer flip notification, in which the signal indicates the memory from which the currently rendered frame, that is, frame N, may be retrieved. During processing of received data from a media source the graphics processor 500 may store a data frame being constructed in a memory that is designated as a "back buffer." When the data frame N is ready to be transmitted, the issuing of a frame buffer flip notification may switch the designation of the back buffer where the data frame is currently stored, such that the former back buffer is designated as a "front buffer" from which data is to be retrieved by the display engine device 502. Each time the graphics processor generates a signal such as a frame buffer flip notification, the display engine device 502 is alerted to the current path for retrieving the updated data frame to be transmitted to the display 510.

As further depicted by the data frame retrieval timeline 540 in FIG. 5*a*, the display engine device delivers to the display 510 media content 512 that contains the data frames N, N+1, N+2 at a series of different instances. However, in the example specifically illustrated in FIG. 5*a*, it is assumed that the display refresh rate of display 510 is 60 Hz, meaning that the display is refreshed multiple times between the instances $t_1$, $t_2$, $t_3$ at which a new data frame is rendered. In particular, the interval $t_R$ corresponding to a refresh rate of 60 Hz is equal to 16.6 msec. In order to reconcile the longer interval of $t_N$ (41.6 msec) that spans the time between rendering of successive data frames N, N+1, N+2 during playback at 24 frames per second with the shorter interval $t_R$ between successively refreshed screen displays on display 510, each data frame is fetched by the display engine device 502 multiple times and transmitted at least twice to the display 510.

In the example of FIG. 5*a*, in order to reconcile the different timing between DVD frame rate and display refresh rate, the display engine device 502 retrieves a first data frame three separate times and transmits the data frame to the display device 510, followed by fetching and transmitting a next data frame to display device 510 on two separate occasions. For example, frame N is sent to display device three separate times at an interval of 16.6 msec, while frame N+1 is sent twice, as shown in FIG. 5. In one implementation, after the frame N is sent three times, a signal 506 is sent from graphics processor 500 to display engine device 502, which signal may constitute a frame buffer flip notification that indicates that the frame N+1 is ready to be retrieved from a (now) front buffer designated by the signal 506. Consequently, the frame N+1 is delivered twice, after which a signal 508, constituting a further frame buffer flip notification, is sent to display engine device 502. The signal 508 indicates the buffer for retrieving a subsequent data frame N+2, to be sent to display 50 at total of three times, followed by a data frame N+3 (not shown) to be sent twice, and so forth. The total duration of five transmissions of two successive data frames at an interval $t_R$ of 16.6 msec spans 83 msec, or two times the 41.6 msec interval for the 24 frame per second frame rate $t_N$.

As is evident from FIG. 5*a*, a rendered data frame is fetched from system memory and transmitted an average of 2.5 times to the display 510 in order to provide a relatively smooth presentation of a streaming media having a native frame rate of 24 frames per second. This may present an undesirable number of operations to support streaming of the media to be played back on display 500, which may incur an undesirable amount of system power.

Consistent with the present embodiments, FIG. 5*b* depicts a scheme for playback of a digital medium where the frame rate of the digital medium differs from that of the display device that avoids problems engendered by the scheme shown in FIG. 5*a*. For the purposes of comparison to FIG. 5*a*, the frame rate of the digital medium may be assumed to be 24 frames per second and the refresh rate of the display device 50 Hz. As shown in FIG. 5*b*, the graphics logic 104 may render a series of data frames to playback media on a display device 110. In particular, the data frame rendering timeline 550 in FIG. 5*b* illustrates the rendering of a series of data frames N, N+1, N+2 at an interval $t_N$ that corresponds to a native frame rate, which may be 24 frames per second as in the example of FIG. 5*a*, thereby producing a value of $t_N$ of 41.6 msec. When data is received by the graphics logic 104, the rendered data frame may be stored in system memory, such as memory 108. Although the data may be rendered and stored at regular intervals as suggested by FIG. 5*b*, the interval between each successive data frame N, N+1, N+2 may not be the same. However, on average, a new data frame may be stored to system memory every $1/24$ second, or approximately 41.6 msec during playback of a digital medium such as DVD. As further depicted by the data frame retrieval timeline 560 in FIG. 5*b*, the display engine 106 may then deliver to the display device 110 media content 520 that contains the data frames N, N+1, N+2 at a series of different instances.

In particular, as illustrated in FIG. 5*b*, after rendering of the data frame N the graphics logic 104 may send to display engine 106 a signal 514, which may constitute a frame buffer flip notification as described above with respect to FIG. 5*a*. At time $t_4$ the display engine 106 may then retrieve the stored data frame N from a buffer designated by the signal 514, and forward the data frame N to display device 110. Subsequently, when the data frame N+1 is rendered and stored in memory 108, the graphics logic 104 may send a signal 516, which may alert the display engine 106 that a subsequent data frame N+1 is stored in the buffer designated by the signal 516 and is ready for transmission to the display device 110. In contrast to the scenario of FIG. 5*a*, however, during the interval between sending of consecutive signals 514 and 516, the display engine 106 only fetches and transmits frame N to display device 110 in a single instance, that is, at a single time. In this manner, the rate of rendering data frames and transmitting the data frames to the display may match one another, thereby eliminating the redundancy illustrated in FIG. 5*a*. As shown in FIG. 5*b*, the media content 520 that is sent from display engine 106 to the display device 110 includes only one copy each of the data frames N, N+1, and N+2. Because the display device 110 may include a timing controller 404 and memory 406 (see FIG. 4) that may store at least one data frame, the display device 110 may refresh its display screen with the presently stored data frame according to the set refresh rate for the display device 110, for example, every 16.6 msec, even though a new data frame is received from display engine 106 only at intervals of 41.6 msec for 24 frame/sec frame rate.

An advantage of the arrangement depicted in FIG. 5*b* is that the intervals between performing tasks such as fetching and distributing data frames to a display are extended as compared to conventional techniques in which data frames may be shipped from system memory to display at a rate corresponding to the display panel refresh rate. Once a signal such as a frame buffer flip notification is issued by the graphics logic 104 indicating a current data frame to be transmitted for display, various components of a system including a CPU and graphics logic may be placed in a low power mode for an interval until subsequent data is to be processed to render new data frame(s). In one example of DVD streaming at 24 msec frame rate, this interval may correspond to the remaining portion of the 41 msec duration for $T_N$, during which the CPU 102 and graphics logic 104 may enter a low power mode. In cases in which at least portions of the CPU are to remain awake to perform non-graphics, non-display related processing, the display-related data path may remain idle, thereby realizing power saving over conventional schemes.

Figure 6:
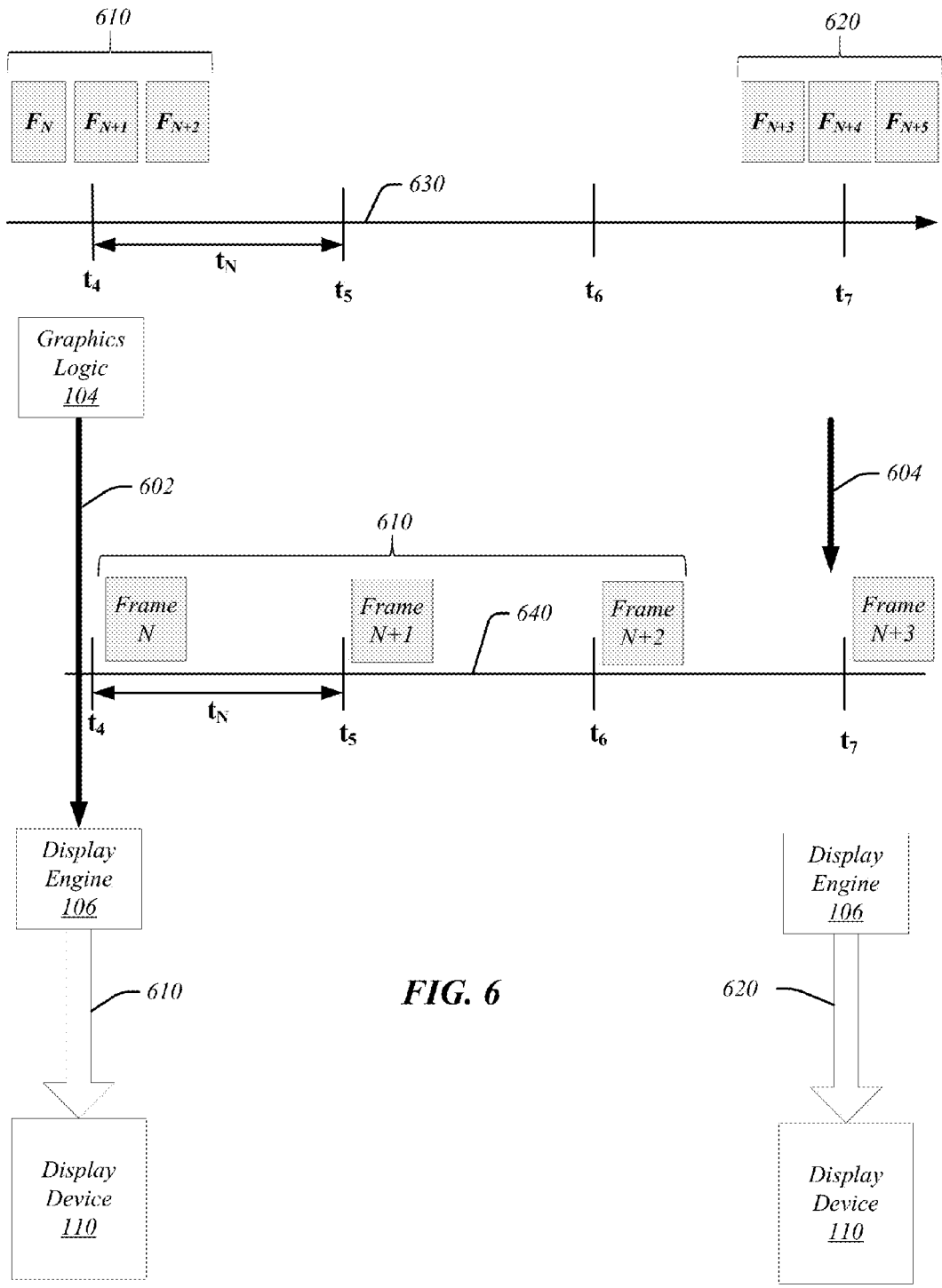
FIG. 6 depicts operation of another embodiment.

In various additional embodiments, a graphics logic may render multiple data frames at one time so that data frames can be prepared in advance of the time the data frames are to be transmitted to a display. For example, the graphics logic 104 may be operable to look ahead in its command queue to process a limited number of data frames ahead of the data frame currently being transmitted for display. FIG. 6 depicts an embodiment in which the graphics logic 104 prepares three data frames at a time. As illustrated the data frame rendering timeline 630, at the time $t_4$, the graphics logic 104 prepares media content 610 that comprises data frames $F_N$, $F_{N+1}$, and $F_{N+2}$. After receiving a signal 602 from the graphics logic 104, as shown by the data frame retrieval timeline 640 the display engine 106 may transmit the media content 610 where successive data frames are sent to the display device 110 at a series of instances $t_4$, $t_5$, $t_6$ separated by the interval $t_N$. Subsequently, at the time the graphics logic 104 may prepare a further set of media content 620, which may include three additional data frames $F_{N+3}$, $F_{N+4}$, and $F_{N+5}$. These new data frames may be stored to memory 108 and a signal 604 may be sent to display engine 106. Subsequently, the display engine 106 may send to the display 110 at a series of instances the media content 620 as a series of data frames $F_{N+3}$, $F_{N+4}$, and $F_{N+5}$, beginning with $F_{N+3}$ which is sent at $T_7$. During the interval between preparing (rendering) a first set of three data frames and sending a signal 602, and the time for preparing the next set of data frames for transmission, the CPU 102 and/or graphics logic 104 may go to sleep, that is, may enter a low power mode. In the example of FIG. 6, assuming a frame rate of 24 frames per second, the duration of the low power mode may extend over multiple $t_N$ intervals, where each $t_N$ interval is 41.6 msec. Thus, the low power mode may extend for over 100 msec before the CPU 102 and graphics logic 104 are to wake up to begin processing further sets of data frames.

Figure 7:
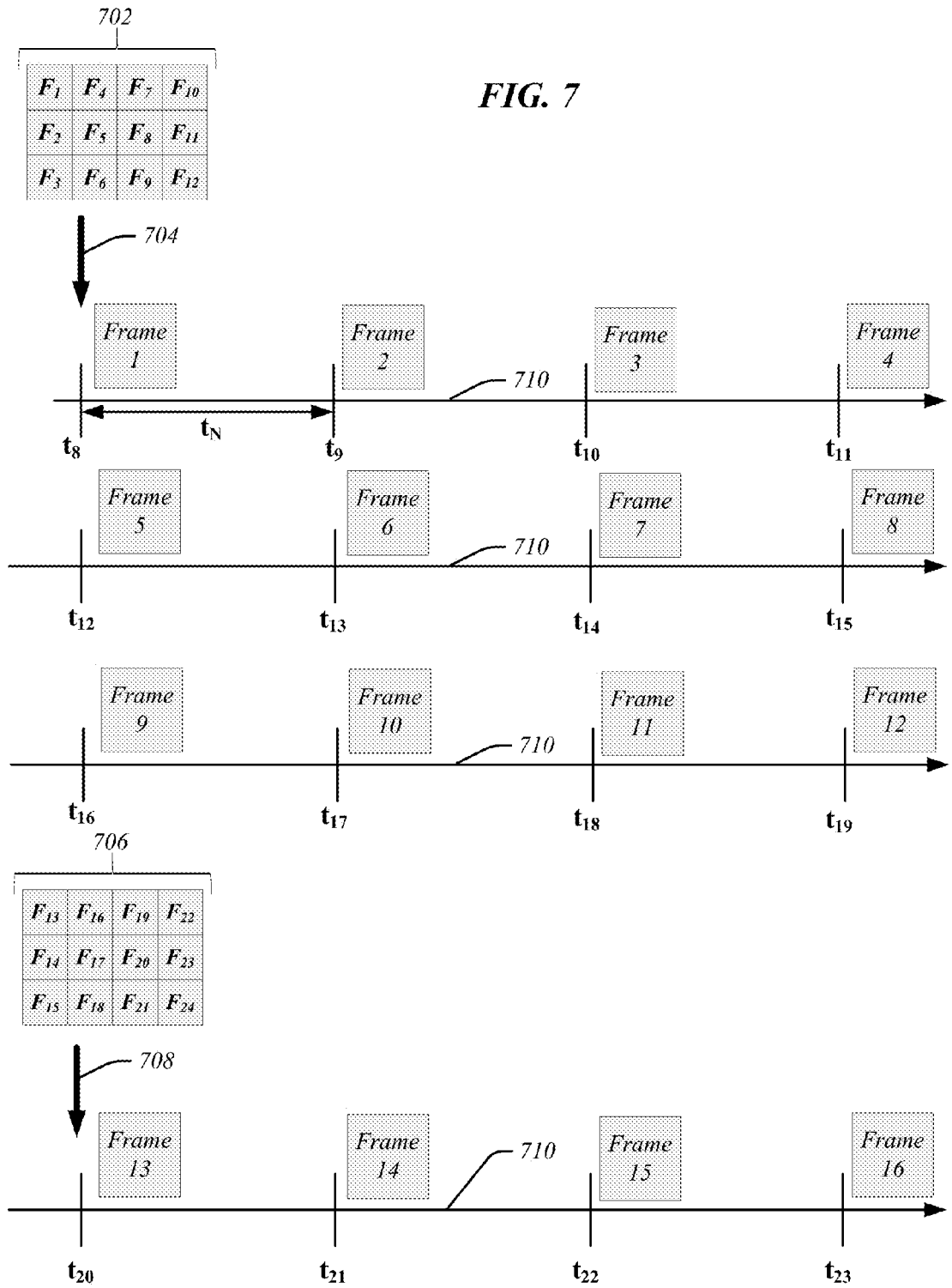
FIG. 7 depicts operation of a further embodiment.

Because of the advanced ability of modern graphics processors, it is possible for graphics logic to render many data frames in advance, for example up to about thirty data frames. FIG. 7 depicts a further embodiment in which twelve data frames are rendered at a time. A graphics logic component (not depicted in FIG. 7) may prepare media content 710 comprising frames $F_1$ to $F_{12}$ at the time $T_8$ as shown in FIG. 7.

After receiving a signal 704 from the graphics logic, as shown by the data frame retrieval timeline 710, the display engine (also not explicitly shown) may transmit the media content 702 where twelve successive data frames $F_1$ to $F_{12}$ are sent to a display device (not shown) at a respective series of instances $t_8$ to $t_{19}$, separated by the interval $t_N$. Subsequently, at the time $t_{20}$, the graphics logic may prepare a further set of media content 706, which may include twelve additional data frames $F_{13}$ to $F_{24}$. These new data frames may be stored to memory and a signal 708 may be sent to display engine, which may send to the display at a series of instances the media content 706 as a series of data frames $F_{13}$, to $F_{24}$, beginning with $F_{13}$ sent at $T_{20}$. As in the case of FIG. 6, during the interval between preparing (rendering) a first set of twelve data frames and sending a signal 704, and the time for preparing the next set of data frames for transmission, the CPU and/or graphics logic may go to sleep, that is, may enter a low power mode. In the example of FIG. 7, again assuming a frame rate of 24 frames per second, the duration of the low power mode may extend over multiple $t_N$ intervals, where each $t_N$ interval is 41.6 msec. Thus, the low power mode may extend for a factor of about eleven times or more the interval $t_N$ depending on the total time required for the CPU/graphics logic to enter and exit a low power mode and the total time to prepare each set of twelve data frames. In this manner, neglecting any non-graphics, non-display related processing, the low power mode may extend for up to about 500 msec (=12×41.6 msec) in the example of FIG. 7.

Although FIGS. 5b, 6 and 7 provide examples that facilitate extending duration of lower power mode while processing media, such as DVD, the present embodiments are not limited to processing media.

Figure 8:
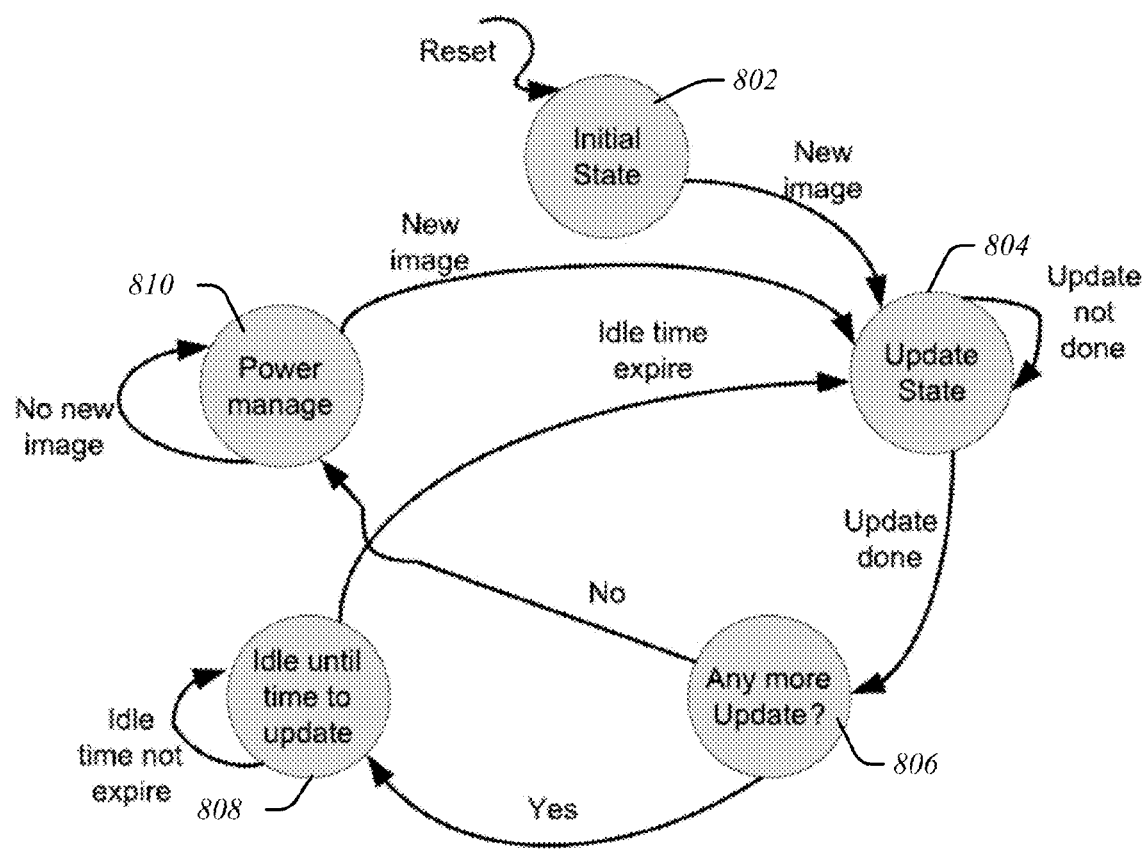
FIG. 8 depicts a state flow diagram in accordance with various embodiments.

FIG. 8 depicts a state flow diagram in accordance with various embodiments. When a system is in an initial state 802 and a new image is received, the flow moves to 804, where the state is updated. The system remains in at update state 804 until the current updating is complete, after which a decision is made at 806 if further updates are to be done. If so, the flow moves to 808 in which the system enters an idle state until the idle time expires. Subsequently the flow returns to 804 where an additional system update is performed. If no further system updates are to be performed, the flow moves to 810 at which the system enters a power management state. During the power management state if no new images are received, the system may remain in the power management state, which may place one or more of various components, such as a CPU, GPU, voltage regulators, display interface, and so forth, into a lower power mode. When a new image is received while the system is in the power management state, the flow returns to 804, where further updating is performed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
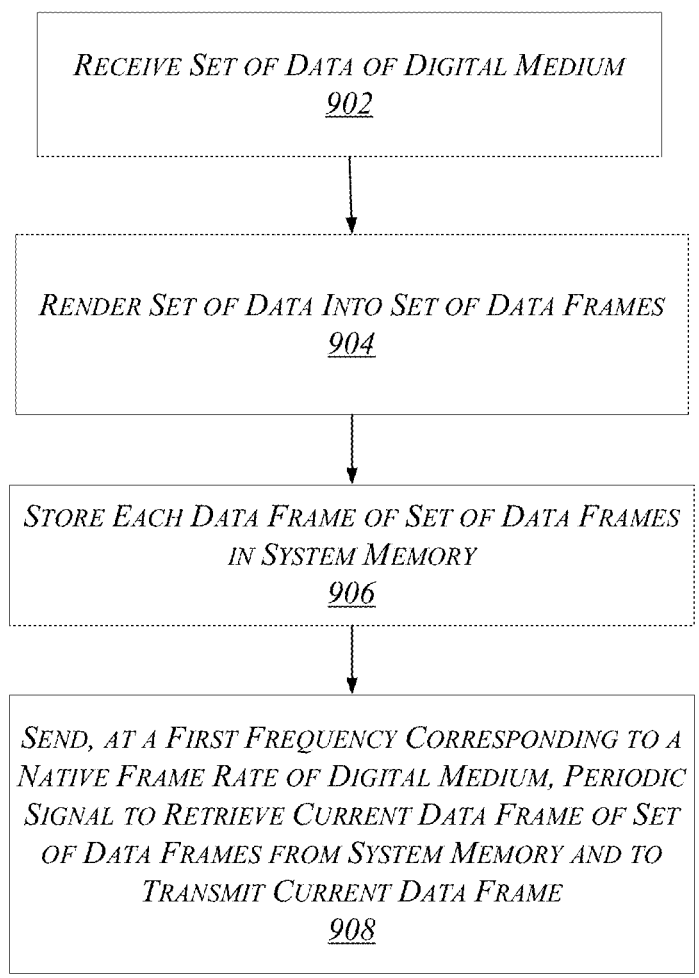
FIG. 9 presents an exemplary first logic flow.

FIG. 9 depicts an exemplary first logic flow 900. At block 902, a set of data of a digital medium is received. The data may include image data, such as data to construct data frames for presentation on a display. At block 904, the set of data is rendered into a set of data frames. At block 906, the set of data frames is stored to a memory. For example, the set of data frames may be stored to a buffer for subsequent transmission to a display to present the data frames as a video presentation. At block 908, a periodic signal is sent at a first frequency corresponding to the native frame rate of the digital medium to retrieve the current data frame of the set of data frames from the system memory and to transmit the current data frame. In one example, a graphics processor or graphics logic may send a frame buffer flip notification to a display engine that directs the display engine to system memory "front buffer" where the next data frame to be transmitted to a display device is stored.

Figure 10:
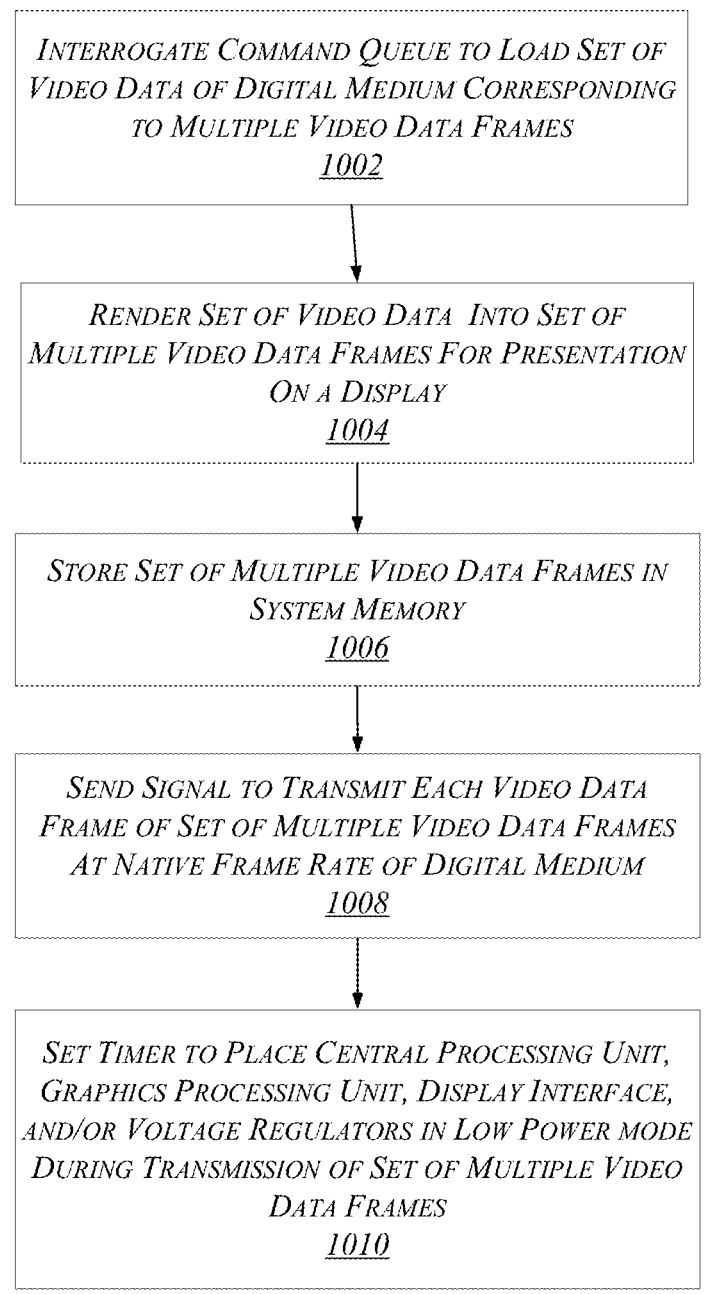
FIG. 10 depicts an exemplary second logic flow.

FIG. 10 depicts an exemplary second logic flow 1000. At block 1002, a Command Queue is interrogated to load a set of video data of a digital medium. In one example, during playback of a digital medium, a graphics processor may look forward in the queue to capture video data of the digital medium that corresponds to multiple video data frames ahead of a video data frame that is currently being transmitted for display.

At block 1004, a set of video data of the digital medium is rendered into multiple video data frames, and at block 1006, the multiple video data frames are stored to system memory.

At block 1008, a signal is sent to transmit each video data frame of the set of multiple video data frames at a native frame rate of the digital medium. For example, graphics logic may direct the display engine to retrieve a video data frame from system memory once every 41.6 msec in the case of 24 frame per second DVD playback.

At block 1010, a timer is set to place components such as a central processing unit, graphics processing unit, display interface and/or voltage regulator into a low power mode during the transmission of the set of multiple video data frames. In an example of 24 frame per second DVD playback characterized by a 41.6 msec interval between transmission of successive data frames, the timer for the low power mode may not expire for up to 500 msec or even one second depending upon the number video data frames in the set that are transmitted.

Figure 11:
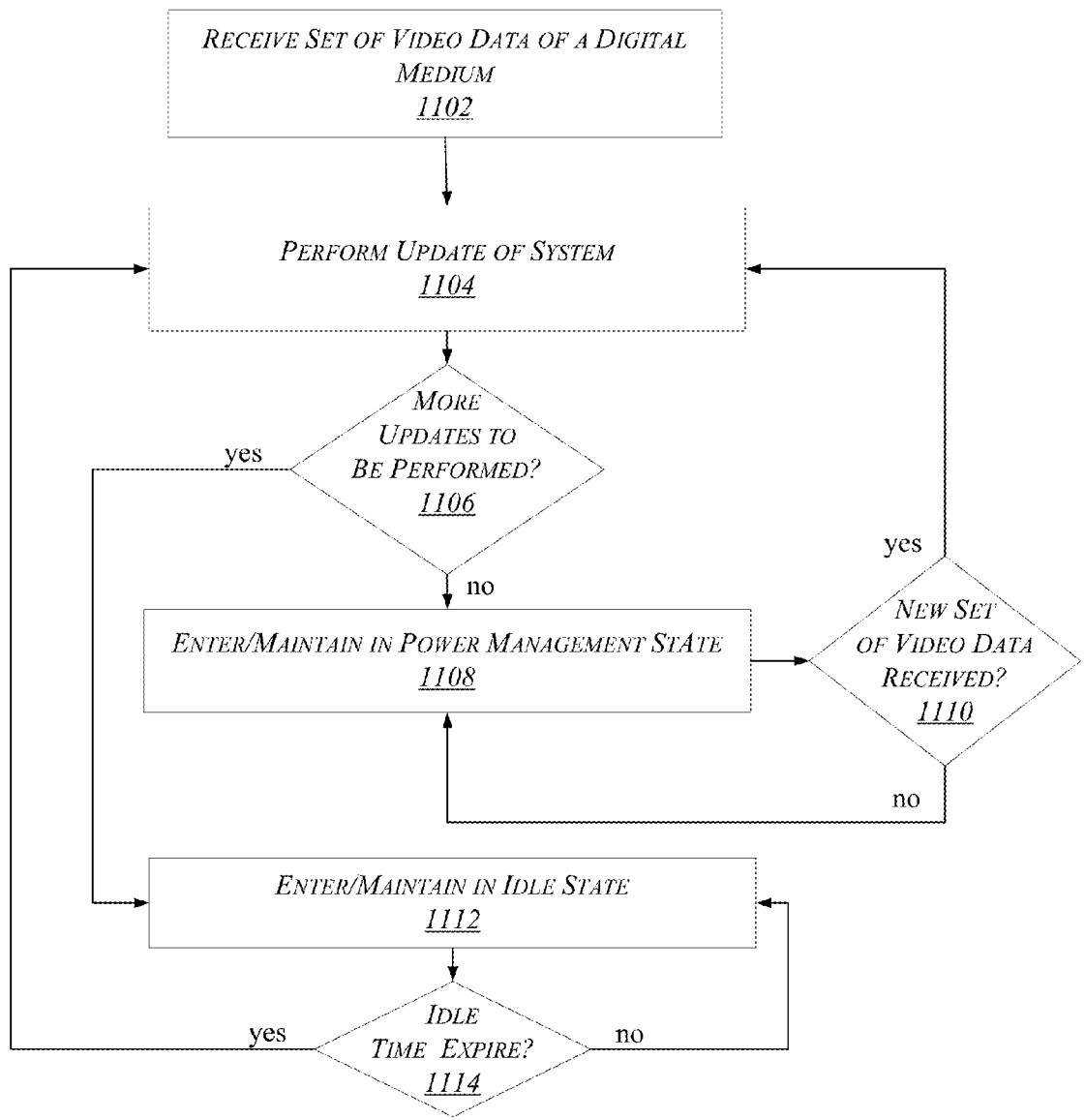
FIG. 11 depicts an exemplary third logic flow.

FIG. 11 depicts an exemplary third logic flow 1100. At block 1102, a set of video data of a digital medium is received by a system. At block 1104, a system update is performed. The flow then proceeds to block 1106, where it is determined whether additional updates are to be performed. If no additional updates are to be performed, the flow proceeds to block 1108 where the system enters a power management state. A power management state may correspond to a higher C-state for a system processor, such as a C-1 to C-6 state, in which one or more components of the processor are inactivated or placed in a lower performance state than when the system processor in an active (C-0) state. The flow then proceeds to block 1110 where a determination is made as to whether a new set of video data has been received.

If, at block 1110, it is determined that new video data has been received, the flow returns to block 1104, where the system is updated. If, at block 1110, no new video data has been received, the flow returns to block 1108, where the system is maintained in a power management state.

If, at block 1106, it is determined that more system updates are to be performed, the flow proceeds to block 1112. At block 1112, the system enters an idle state. The system may set an idle timer corresponding to an interval for the system to remain in the idle state before further system updates are to be performed. The flow then proceeds to block 1114, where a determination is made as to whether the idle timer has expired. If not, the flow returns to block 1112 where the system maintains in an idle state. If so, the flow moves to block 1104 where further system updating is performed.

Figure 12:
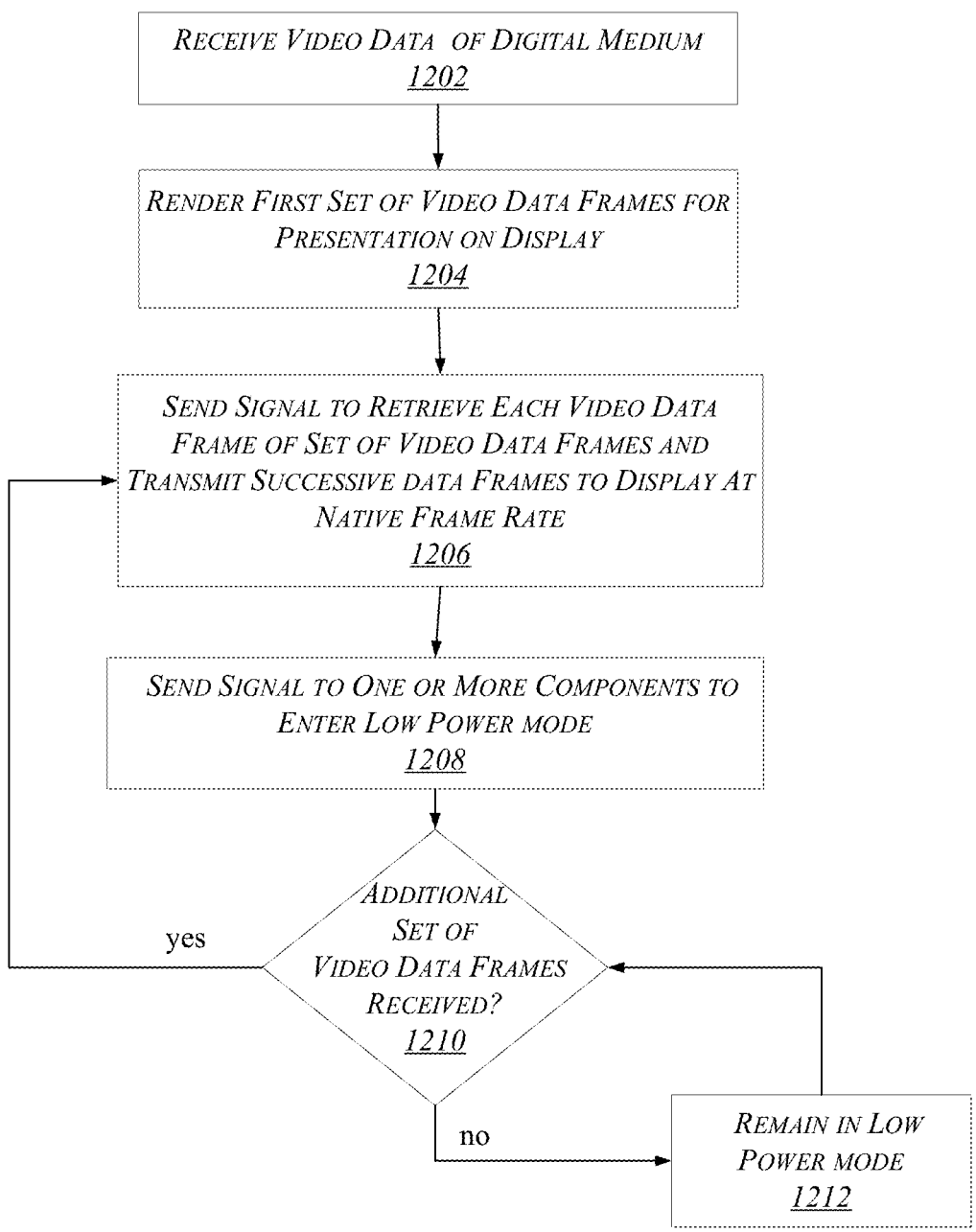
FIG. 12 depicts an exemplary fourth logic flow.

FIG. 12 depicts an exemplary fourth logic flow 1200. At block 1202 video data of a digital medium is received. At block 1204, a first set of video data frames is rendered for presentation on a display based upon the received video data. At block 1206 a signal is sent to retrieve each video data frame of the set of video data frames and to transmit successive data frames to a display at the native frame rate of the digital medium. For example, the signal may direct a display engine to a set of multiple video data frames that are stored in system memory for transmission to the display at a frame rate of 24 frames per second.

At block 1208, a signal is sent to one or more components to enter a low power mode. In one example, the low power mode may correspond to a higher C-state for a processor. The flow then proceeds to block 1210 where a determination is made as to whether any additional set of video data frames has been received. If not, the flow moves to block 1212, where the system remains in low power mode. If so, the flow returns to block 1206.

FIG. 13 illustrates an embodiment of an exemplary computing architecture 1300 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi-processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD); and a solid state drive (SSD) 1323 to read or write data to/from a non-volatile memory (NVM) 1325, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 1314, FDD 1316, optical disk drive 1320, and solid state drive 1323 can be connected to the system bus 1308 by a HDD interface 1324, an FDD interface 1326, an optical drive interface 1328, and a solid state drive interface 1329, respectively. The HDD interface 1324 for external drive implementations can include at least one or both of Universal Serial Bus (USB) and IEEE 1394 interface technologies. The solid state drive interface 1329 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a memory and graphics logic operative to render a set of one or more data frames for storage in the memory using a received set of data of a digital medium, and output one or more control signals at a first interval. The apparatus may also include a display engine operative to receive the one or more control signals from the graphics logic, retrieve the set of one or more data frames from the memory, and send the one or more data frames to a display device for visual presentation. The one or more data frames may be sent periodically in succession at a second interval corresponding to a native frame rate of the digital medium.

In another embodiment, the graphics logic may be operative to send a signal to one or more devices to enter a low power mode between sending a first control signal to the display engine to retrieve a first set of one or more data frames and sending a next control signal to the display engine to retrieve a next set of one or more data frames, the low power mode to span a period of time equal to the first interval.

Alternatively, or in addition, in another embodiment the second interval may be less than the first interval.

Alternatively, or in addition, in a further embodiment the one or more devices including a central processing unit (CPU), a graphics processing unit (GPU) and voltage regulator.

Alternatively, or in addition, in a further embodiment the data frames may comprise compressed data.

Alternatively, or in addition, in a further embodiment the second interval may comprise 1/24 second.

Alternatively, or in addition, in a further embodiment the graphics logic may be operative to look ahead in a command queue to process a multiplicity of frames to be forwarded for transmission by the display engine, to render the multiplicity frames as a multiplicity of data frames in an instance, and to store the multiplicity of data frames to system memory.

Alternatively, or in addition, in a further embodiment, the set of control signals may comprise a frame buffer flip notification in which designation of the first memory is switched from a back buffer to a front buffer to be read by the display engine.

Alternatively, or in addition, in a further embodiment the display engine may be operative to enter a low power mode between transmission of a current data frame and transmission of a next data frame.

Alternatively, or in addition, in a further embodiment the apparatus may comprise a digital display operative to present the data frames as a video presentation, the digital display having a refresh rate corresponding to a third interval that is less than the second interval or less than the first interval.

Alternatively, or in addition, in a further embodiment each data frame of the one or more data frames may be sent in a single instance.

In another embodiment, a computer implemented method may include rendering a set of one or more data frames for storage in a first memory using a received set of data of a digital medium. The computer implemented method may further include outputting one or more control signals at a first interval, retrieving the set of one or more data frames from the first memory, and sending the one or more data frames sent periodically in succession at a second interval corresponding to a native frame rate of the digital medium.

In another embodiment, the computer implemented method may include sending a signal to one or more devices to enter a low power mode during a period between sending a first control signal to the display engine to retrieve a first set of one or more data frames and sending a next control signal to the display engine to retrieve a next set of one or more data frames, the low power mode to span a period of time equal to the first interval.

Alternatively, or in addition, in a further embodiment the computer implemented method may include sending a signal to one or more of a central processing unit (CPU), a graphics processing unit (GPU) and voltage regulator to enter a low power mode during the period.

Alternatively, or in addition, in a further embodiment the second period may equal 1/24 second.

Alternatively, or in addition, in a further embodiment the method may include rendering a multiplicity of data frames comprising the first set of data frames at a first instance, and rendering a second multiplicity of data frames comprising the next set of data frames at a second instance, where the first and second instance are separated in time by the first interval.

Alternatively, or in addition, in a further embodiment the computer implemented method may include setting a timer for the low power mode to span a third interval equal to at least two times the second interval.

Alternatively, or in addition, in another embodiment, the computer implemented method may comprise sending each data frame of the one or more data frames at a single instance, where the second interval is less than the first interval.

In another embodiment, an apparatus may comprise a memory and graphics logic, the graphics logic to render a set of one or more data frames for storage in a memory using a received set of data of a digital medium output one or more control signals at a first interval, the control signals operative to direct transmission of the one or more data frames periodically in succession at a second interval corresponding to a native frame rate of the digital medium.

In another embodiment the graphics logic may be operative to send a signal to one or more devices to enter a low power mode between sending a first control signal to the display engine to retrieve a first set of one or more data frames and sending a next control signal to the display engine to retrieve a next set of one or more data frames, the low power mode to span a period of time equal to the first interval.

Alternatively, or in addition, in a further embodiment, the second interval may be less than or equal to the first interval.

Alternatively, or in addition, in a further embodiment, the graphics logic may be operative to look ahead in a command queue to process a multiplicity of frames to be forwarded for transmission, render the multiplicity frames as a multiplicity of data frames in an instance, and store the multiplicity of data frames to the memory.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory;
graphics logic operative to:
  look ahead in a command queue to process a multiplicity of data frame;
  render the multiplicity of data frames using a received set of data of a digital medium in an instance, the received set of data to comprise a frame rate;
  store the multiplicity of data frames to the memory;
  output a first control signal at a first interval; and
  send a second control signal to one or more devices, the second control signal to include an indication to enter a low power mode for a period of time, the period of time based on the quantity of individual frames in the multiplicity of frames and the frame rate and substantially equal to the product of the quantity of individual frames in the multiplicity of frames and the frame rate; and
a display engine operative to:
  receive the first control signal from the graphics logic;
  retrieve the multiplicity of data frames from the memory; and
  send the multiplicity of data frames to a display device for visual presentation in a single instance.

2. The apparatus of claim 1, the one or more devices including a central processing unit (CPU), a graphics processing unit (GPU), or a voltage regulator.

3. The apparatus of claim 1, the multiplicity of data frames comprising compressed data.

4. The apparatus of claim 1, the display device comprising a refresh rate, the frame rate comprising $1/24^{th}$ of a second and the refresh rate less than or equal to $1/48^{th}$ of a second.

5. The apparatus of claim 1, the control signal comprising a frame buffer flip notification in which designation of the memory is switched from a back buffer to a front buffer to be read by the display engine.

6. The apparatus of claim 1, comprising the display device, the display device operative to present the multiplicity of data frames as a video presentation, the refresh rate comprising 48 Hz or greater.

7. A computer implemented method, comprising:
looking ahead in a command queue to process a multiplicity of data frames;
rendering the multiplicity of data frames for storage in a first memory using a received set of data of a digital medium, the received set of data to comprise a frame rate;
outputting a first control signal at a first interval;
retrieving the multiplicity of data frames from the first memory;
sending the multiplicity of data frames to a display device for visual presentation in a single instance; and
sending a second control signal to one or more devices, the second control signal to include an indication to enter a low power mode for a period of time, the period of time based on the quantity of individual frames in the multiplicity of frames and the frame rate and substantially equal to the product of the quantity of individual frames in the multiplicity of frames and the frame rate.

8. The computer implemented method of claim 7, the one or more devices comprising a central processing unit (CPU), a graphics processing unit (GPU), or voltage regulator.

9. The computer implemented method of claim 7, the frame rate being $1/24^{th}$ of a second.

10. At least one non-transitory computer-readable storage medium comprising instructions that, when executed, cause a system to:
look ahead in a command queue to process a multiplicity of data frames;
render the multiplicity of data frames for storage in a first memory using a received set of data of a digital medium, the received set of data to comprise a frame rate;
output a first control signal at a first interval;
retrieve the multiplicity of data frames from the first memory;
send the multiplicity of data frames to a display device for visual presentation in a single instance; and
send a second control signal to one or more devices, the second control signal to include an indication to enter a low power mode for a period of time, the period of time based on the quantity of individual frames in the multiplicity of frames and the frame rate and substantially equal to the product of the quantity of individual frames in the multiplicity of frames and the frame rate.

11. The at least one computer-readable storage medium of claim 10, the one or more device a central processing unit (CPU), a graphics processing unit (GPU), or voltage regulator.

12. The at least one computer-readable storage medium of claim 10, the frame rate equal $1/24^{th}$ of a second and a refresh rate of the display device less than or equal to $1/48^{th}$ of a second.

13. An apparatus, comprising:
a memory;
graphics logic operative to:
look ahead in a command queue to process a multiplicity of data frames;
render the multiplicity of data frames for storage in a first memory using a received set of data of a digital medium, the received set of data to comprise a frame rate;
output a first control signal at a first interval, the first control signal operative to direct transmission of the multiplicity of data frames to a display device for visual presentation in a single instance, a refresh rate of the display device to exceed the frame rate; and
send a second control signal to one or more devices, the second control signal to include an indication to enter a low power mode for a period of time, the period of time based on the quantity of individual frames in the multiplicity of frames and the frame rate and substantially equal to the product of the quantity of individual frames in the multiplicity of frames and the frame rate.

14. The apparatus of claim 13, the one or more devices including a central processing unit (CPU), a graphics processing unit (GPU), or a voltage regulator.

\* \* \* \* \*